(12) United States Patent
Soltis

(10) Patent No.: US 7,552,197 B2
(45) Date of Patent: Jun. 23, 2009

(54) STORAGE AREA NETWORK FILE SYSTEM

(75) Inventor: Steven R. Soltis, Rochester, MN (US)

(73) Assignee: DataPlow, Inc., Rochester, MN (US)

( * ) Notice: Subject to any disclaimer, the term of this patent is extended or adjusted under 35 U.S.C. 154(b) by 0 days.

(21) Appl. No.: 11/637,315

(22) Filed: Dec. 12, 2006

(65) Prior Publication Data

US 2007/0094354 A1 Apr. 26, 2007

Related U.S. Application Data

(63) Continuation of application No. 10/028,010, filed on Dec. 21, 2001, now Pat. No. 7,165,096.

(60) Provisional application No. 60/257,446, filed on Dec. 22, 2000.

(51) Int. Cl.
*G06F 15/16* (2006.01)
*G06F 17/30* (2006.01)
(52) U.S. Cl. .................................. 709/217; 707/10
(58) Field of Classification Search ............... 709/217; 707/10
See application file for complete search history.

(56) References Cited

U.S. PATENT DOCUMENTS

| 5,043,876 A | 8/1991 | Terry |
| 5,202,971 A | 4/1993 | Henson et al. |
| 5,561,799 A | 10/1996 | Khalidi et al. |
| 5,652,913 A | 7/1997 | Crick et al. |

(Continued)

OTHER PUBLICATIONS

Computer Technology Review, Sep. 1999, File System Working Group—association to improve storage-area networking—Industry Trend or Event, URL: http://findarticles.com/p/articles/mi_m0BRZ/is_9_19/ai_57778468.*

(Continued)

*Primary Examiner*—Larry D Donaghue
*Assistant Examiner*—Chirag R Patel
(74) *Attorney, Agent, or Firm*—Beck & Tysver, P.L.L.C.

(57) ABSTRACT

A shared storage distributed file system is presented that provides applications with transparent access to a storage area network (SAN) attached storage device. This is accomplished by providing clients read access to the devices over the SAN and by requiring most write activity to be serialized through a network attached storage (NAS) server. Both the clients and the NAS server are connected to the SAN-attached device over the SAN. Direct read access to the SAN attached device is provided through a local file system on the client. Write access is provided through a remote file system on the client that utilizes the NAS server. A supplemental read path is provided through the NAS server for those circumstances where the local file system is unable to provide valid data reads. Consistency is maintained by comparing modification times in the local and remote file systems. Since writes occur over the remote file systems, the consistency mechanism is capable of flushing data caches in the remote file system, and invalidating metadata and real-data caches in the local file system. It is possible to utilize unmodified local and remote file systems in the present invention, by layering over the local and remote file systems a new file system. This new file system need only be installed at each client, allowing the NAS server file systems to operate unmodified. Alternatively, the new file system can be combined with the local file system.

29 Claims, 12 Drawing Sheets

U.S. PATENT DOCUMENTS

| | | | |
|---|---|---|---|
| 5,668,958 | A | 9/1997 | Bendert et al. |
| 5,740,230 | A | 4/1998 | Vaudreuil |
| 5,758,342 | A | 5/1998 | Gregerson |
| 5,764,972 | A | 6/1998 | Crouse et al. |
| 5,802,366 | A | 9/1998 | Row et al. |
| 5,828,876 | A | 10/1998 | Fish et al. |
| 5,909,540 | A | 6/1999 | Carter et al. |
| 5,931,918 | A | 8/1999 | Row et al. |
| 5,933,603 | A | 8/1999 | Vahalia et al. |
| 5,978,773 | A | 11/1999 | Hudetz et al. |
| 5,987,621 | A | 11/1999 | Duso et al. |
| 6,161,104 | A | 12/2000 | Stakutis et al. |
| 6,289,356 | B1 | 9/2001 | Hitz et al. |
| 6,442,682 | B1 | 8/2002 | Pothapragada et al. |
| 6,658,417 | B1 * | 12/2003 | Stakutis et al. ............... 707/10 |
| 2001/0037406 | A1 | 11/2001 | Philbrick et al. |
| 2002/0112022 | A1 * | 8/2002 | Kazar et al. ................ 709/217 |

OTHER PUBLICATIONS

T. Anderson, M. Dahlin, J. Neefe, D. Patterson, D. Roselli, and R. Wang, "Serverless Network File System," Proceedings of the Fifteenth ACM Symposium on Operating System Principles, 1995, The Association for Computer Machinery (ACM) Press, New York, NY USA.

M. Devarakonda, A. Mohindra, J. Simoneaux, and W. Tetzlaff, "Evaluation of Design Alternatives for a Cluster File System," 1995 USENIX Technical Conference on UNIX and Advanced Computing Systems, Jan. 1995, pp. 35-46, USENIX Association, Berkeley, CA USA.

G. Gibson, D. Nagle, K. Amiri, F. Chang, H. Gobioff, E. Riedel, D. Rochberg, and J. Zelenka, "File Server Scaling with Network-Attached Secure Disks," Proceedings of the ACM International Conference on Measurements and Modeling of Computer Systems, Jun. 1997, The Association for Computer Machinery (ACM) Press New York NY USA.

G. Gibson, D. Nagle, K. Amiri, F. Chang, E. Feinberg, H. Gobioff, C. Lee, B. Ozceri, E. Riedel, D. Rochberg, and J. Zelenka, "Filesystems for Network-Attached Secure Disks," Carnegie Mellon University Technical Report CMU-CS-97-118, Jul. 1997, Carnegie Mellon University, Pittsburgh, PA USA.

J. Heidemann and G. Popek, "File System Development with Stackable Layers," ACM Transaction on Computer Systems, 1994, pp. 58-89, The Association for Computer Machinery (ACM) Press, New York, NY USA.

Y. Khalidi and M. Nelson, "Extensible File Systems in Spring", Sun Microsystems Laboratories Technical Report TR-93-18, Sep. 1993, Sun Microsystems Laboratories, Inc., Mountain View, CA USA.

S. Kleiman, "Vnodes: An Architecture for Multiple File System Types In Sun UNIX," Proceedings of the Summer USENIX Conference, Jun. 1986, pp. 238-247, USENIX Association, Berkeley, CA USA.

K. Matthews, "Implementing a Shared File System on a HIPPI Disk Array," Fourteenth IEEE Symposium on Mass Storage Systems, 1995, pp. 77-88, Institute of Electrical and Electronics Engineers, Inc., Piscataway, NJ USA.

J. Ousterhout, A. Cherenson, F. Douglis, M. Nelson, and B. Welch, The Sprite Network Operating System, IEEE Computer, Feb. 1988, pp. 23-36, Institute of Electrical and Electronics Engineers, Inc., Piscataway, NJ USA.

B. Pawlowski, C. Juszczak, P. Staubach, C. Smith, D. Lebel, and D. Hitz, "NFS Version 3: Design and Implementation," Proceedings of the Summer USENIX Conference, 1994, USENIX Association, Berkeley, CA.

D. Rosenthal, "Evolving the Vnode Interface," Proceedings of the Summer USENIX Conference, Jun. 1990, pp. 107-117, USENIX Association, Berkeley, CA USA.

R. Sandberg, D. Goldberg, S. Kleiman, D. Walsh, and B. Lyon, "Design and Implementation of the Sun Network File System," Proceedings of the Summer USENIX Conference, 1985, pp. 119-130, USENIX Association, Berkeley, CA USA.

M. Satyanarayanan, "Scalable, Secure, and Highly Available Distributed File Access," IEEE Computer, May 1990, pp. 9-20, Institute of Electrical and Electronics Engineers, Inc., Piscataway, NJ USA.

M. Satyanarayanan, "Code: A Highly Available File System for a Distributed Workstation Environment," Proceedings of the Second IEEE Workshop Operating Systems, Sep. 1989, Institute of Electrical and Electronics Engineers, Inc., Piscataway, NJ USA.

S. Soltis, The Design and Implementation of a Distributed File System base on Shared Network Storage. PhD Thesis, University of Minnesota, 1997, University of Minnesota, Minneapolis, MN USA.

D. Wiltzius and K. Minuzzo, "Network-attached peripherals (NAP) for HPSS/SIOF," Lawrence Livermore National Laboratory Technical Report, 1995. Available at http://www.lini.gov/liv_comp/siof/siof_nap.html, Livermore, CA USA.

EMC Corporation, "EMC Celerra HighRoad White Paper," Dec. 2000.

* cited by examiner

260 — Application program calls Nasan write function.

262 — Nasan calls rfs function that writes real-data for i_rhandle.

STORAGE AREA NETWORK FILE SYSTEM

PRIORITY

This application is a continuation of U.S. patent application Ser. No. 10/028,010, filed on Dec. 21, 2001, now U.S. Pat. No. 7,165,096, which in turn claims the benefit of U.S. Provisional Application No. 60/257,446, filed Dec. 22, 2000.

FIELD OF THE INVENTION

The present invention relates general to computer file systems. More specifically, the present invention involves a distributed file system that transfers data using both network attached storage (NAS) and storage area network (SAN) protocols.

BACKGROUND OF THE INVENTION

File Systems

The term "file system" refers to the system designed to provide computer application programs with access to data stored on storage devices in a logical, coherent way. File systems hide the details of how data is stored on storage devices from application programs. For instance, storage devices are generally block addressable, in that data is addressed with the smallest granularity of one block; multiple, contiguous blocks form an extent. The size of the particular block, typically 512 bytes in length, depends upon the actual devices involved. Application programs generally request data from file systems byte by byte. Consequently, file systems are responsible for seamlessly mapping between application program address-space and storage device address-space.

File systems store volumes of data on storage devices. The term "volume" refers to the collection of data blocks for one complete file system instance. These storage devices may be partitions of single physical devices or logical collections of several physical devices. Computers may have access to multiple file system volumes stored on one or more storage devices.

File systems maintain several different types of files, including regular files and directory files. Application programs store and retrieve data from regular files as contiguous, randomly accessible segments of bytes. With a byte-addressable address-space, applications may read and write data at any byte offset within a file. Applications can grow files by writing data to the end of a file; the size of the file increases by the amount of data written. Conversely, applications can truncate files by reducing the file size to any particular length. Applications are solely responsible for organizing data stored within regular files, since file systems are not aware of the content of each regular file.

Files are presented to application programs through directory files that form a tree-like hierarchy of files and subdirectories containing more files. Filenames are unique to directories but not to file system volumes. Application programs identify files by pathnames comprised of the filename and the names of all encompassing directories. The complete directory structure is called the file system namespace. For each file, file systems maintain attributes such as ownership information, access privileges, access times, and modification times.

File systems often utilize the services of operating system memory caches known as buffer caches and page caches. These caches generally consist of system memory buffers stored in volatile, solid-state memory of the computer. Caching is a technique to speed up data requests from application programs by saving frequently accessed data in memory for quick recall by the file system without having to physically retrieve the data from the storage devices. Caching is also useful during file writes; the file system may write data to the memory cache and return control to the application before the data is actually written to non-volatile storage. Eventually, the cached data is written to the storage devices.

The state of the cache depends upon the consistency between the cache and the storage devices. A cache is "clean" when its contents are exactly the same as the data stored on the underlying storage devices. A cache is "dirty" when its data is newer than the data stored on storage devices; a cache becomes dirty when the file system has written to the cache, but the data has not yet been written to the storage devices. A cache is "stale" when its contents are older than data stored on the storage devices; a cache becomes stale when it has not been updated to reflect changes to the data stored on the storage devices.

In order to maintain consistency between the caches and the storage devices, file systems perform "flush" and "invalidate" operations on cached data. A flush operation writes dirty cached data to the storage devices before returning control to the caller. An invalidation operation removes stale data from the cache without invoking calls to the storage devices. File systems may flush or invalidate caches for specific byte-ranges of the cached files.

Many file systems utilize data structures called modes to store information specific to each file. Copies of these data structures are maintained in memory and within the storage devices. Inodes contain attribute information such as file type, ownership information, access permissions, access times, modification times, and file size. Inodes also contain lists of pointers that address data blocks. These pointers may address single data blocks or address an extent of several consecutive blocks. The addressed data blocks contain either actual data stored by the application programs or lists of pointers to other data blocks. With the information specified by these pointers, the contents of a file can be read or written by application programs. When an application programs write to files, data blocks may be allocated by the file system. Such allocation modifies the inodes.

Additionally, file systems maintain information, called "allocation tables", that indicate which data blocks are assigned to files and which are available for allocation to files. File systems modify these allocation tables during file allocation and de-allocation. Most modern file systems store allocation tables within the file system volume as bitmap fields. File systems set bits to signify blocks that are presently allocated to files and dear bits to signify blocks available for future allocation The terms real-data and metadata classify application program data and file system structure data, respectively. In other words, real-data is data that application programs store in regular files. Conversely, file systems create metadata to store volume layout information, such as inodes, pointer blocks, and allocation tables. Metadata is not directly visible to applications. Metadata requires a fraction of the amount of storage space that real-data occupies and has significant locality of reference. As a result, metadata caching drastically influences file system performance.

Metadata consistency is vital to file system integrity. Corruption of metadata may result in the complete destruction of the file system volume. Corruption of real-data may have bad consequences to users but will not affect the integrity of the whole volume.

I/O Interfaces

I/O interfaces transport data among computers and storage devices. Traditionally, interfaces fall into two categories: channels and networks. Computers generally communicate with storage devices via channel interfaces. Channels predictably transfer data with low-latency and high-bandwidth performance; however, channels typically span short distances and provide low connectivity. Performance requirements often dictate that hardware mechanisms control channel operations. The Small Computer System Interface (SCSI) is a common channel interfaces. Storage devices that are connected directly to computers are known as direct-attached storage (DAS) devices.

Computers communicate with other computers through networks. Networks are interfaces with more flexibility than channels. Software mechanisms control substantial network operations, providing networks with flexibility but large latencies and low bandwidth performance. Local area networks (LAN) connect computers medium distances, such as within buildings, whereas wide area networks (WAN) span long distances, like across campuses or even across the world. LANs normally consist of shared media networks, like Ethernet, while WANs are often point-to-point connections, like Asynchronous Transfer Mode (ATM). Transmission Control Protocol/Internet Protocol (TCP/IP) is a popular network protocol for both LANs and WANs. Because LANs and WANs utilize very similar protocols, for the purpose of this application, the term LAN is used to include both LAN and WAN interfaces.

Recent interface trends combine channel and network technologies into single interfaces capable of supporting multiple protocols. For instance, Fibre Channel (FC) is a serial interface that supports network protocols like TCP/IP as well as channel protocols such as SCSI-3. Other technologies, such as iSCSI, map the SCSI storage protocol onto TCP/IP network protocols, thus utilizing LAN infrastructures for storage transfers.

The term "storage area network (SAN)" is used to describe network interfaces that support storage protocols. Storage devices connected to SANs are referred to as SAN-attached storage devices. These storage devices are block and object-addressable and may be dedicated devices or general purpose computers serving block and object-level data.

Block and object-addressable devices connect to SANs and share storage among multiple computers. Block-address devices are common storage devices that are addressable by fixed length data blocks or sectors. In contrast, object-addressable devices are impending devices that are addressable by an object identifier and an offset into the object. Each object-addressable device may support numerous objects. Two proposed object-addressable devices are the Seagate Object Oriented Device (OOD) and the Carnegie Mellon University Network Attached Secure Disks (NASD).

SANs are often dedicated networks specifically designed to transport block data; however, SANs may also operate as subsets of general purpose LANs and share the same physical network connections. Therefore, the type of data moving on the network dictates whether a network is a SAN or a LAN.

Local Files Systems

Local file systems service file-level requests for application programs only running on the same computer that maintains the non-shared file system volume. To achieve the highest levels of performance, local file systems extensively cache metadata and real-data within operating system buffer caches and page caches. Because local file systems do not share data among multiple computer systems, performance is generally very good.

Local file systems traditionally store volumes on DAS devices connected directly to the computer. The weakness of using DAS is that should the computer fail, volumes located on the DAS devices become inaccessible. To reclaim access to these volumes, the DAS devices must be physically detached from the original computer and connected to a backup computer.

SAN technologies enable local file system volumes to be stored on SAN-attached devices. These volumes are accessible to several computers; however, at any point in time, each volume is only assigned to one computer. Storing local file system volumes on SAN-attached devices rather than DAS devices has the benefit that the volumes may be easily reassigned to other computers in the event of failures or maintenance.

Distributed Files Systems

Distributed file systems provide users and application programs with transparent access to files from multiple computers networked together. Distributed file systems lack the high-performance found in local file systems due to resource sharing and lack of data locality. However, the sharing capabilities of distributed file systems often compensate for poor performance.

Architectures for distributed file systems fall into two main categories: network attached storage (NAS)-based and storage area network (SAN)-based. NAS-based file sharing, also known as "shared nothing", places server computers between storage devices and client computers connected via LANs. In contrast, SAN-based file sharing, traditionally known as "shared disk" or "share storage", uses SANs to directly transfer data between storage devices and networked computers.

NAS-Based Distributed File Systems

NAS-based distributed file systems transfer data between server computers and client computers across LAN connections. The server computers store volumes in units of blocks on DAS devices and present this data to client computers in a file-level format. These NAS servers communicate with NAS clients via NAS protocols. Both read and write data-paths traverse from the clients, across the LAN, to the NAS servers. In turn, the servers read from and write to the DAS devices. NAS servers may be dedicated appliances or general-purpose computers.

The Sun Microsystems Network File System (NFS) is a popular NAS protocol that uses central servers and DAS devices to store real-data and metadata for the file system volume. These central servers locally maintain metadata and transport only real-data to clients. The central server design is simple yet efficient, since all metadata remains local to the server. Like local file systems, central servers only need to manage metadata consistency between main memory and DAS devices. In fact, central server distributed file systems often use local file systems to manage and store data for the file system. In this regard, the only job of the central server file system is to transport real-data between clients and servers.

Central server designs were the first NAS-based distributed file systems. As the need for greater parallelism and enhanced availability grew, distributed file system designs evolved from central servers to multiple server configurations. As with central servers, multiple servers, also known as distributed servers, store all file system data on DAS devices connected to server computers. Since multiple servers cooperatively manage the file system, servers may share metadata between computers. The complexity of these designs increases an order of magnitude, since distributed system integrity requires strong metadata consistency between servers. Such systems often cannot use local file systems to store data. As a result, server software must manage, store, and transport metadata and real-data between servers. Two examples of distributed server file systems are the Andrew File System (AFS) from Carnegie Mellon University and the Sprite File System from the University of California at Berkeley.

Distributed server file systems have further evolved into designs where clients and servers are often difficult to distinguish. In these systems, clients manage, store, and transport metadata and real-data between servers and other clients. Coda from Carnegie Mellon University and the xFS File System from the University of California at Berkeley are two examples of merged client-server designs.

One aspect of NAS-based file system designs that has remained unchanged among central server, distributed server, and merged client-server designs is the direct attachment of storage devices to computers. With devices directly attached to computers, however, a single computer failure renders data stored on the storage devices inaccessible. Although redundant devices on separate computers can be added to improve availability, such techniques add complexity and cost to the system.

Furthermore, the NAS architecture limits performance when clients access data stored on remote devices, because the data-path between client and storage device includes server computers. These servers add overheads caused by server workloads as well as overheads relating to the translations from channel interface protocols to network interface protocols. Server computers designed to support large workloads are very expensive.

FIG. 1 illustrates the data-paths and components of a typical, prior art NAS-based file sharing environment 100. NAS clients 102 are connected to the NAS server 106 via network-based I/O interface links 110 connected to the LAN 104. The LAN 104 consists of network components such as routers, switches, and hubs. The NAS server 106 connects to DAS devices 108 via channel-based I/O interface links 112. The DAS devices 108 are block addressable, non-volatile storage devices. These interface links 110 and 112 include one or more physical connections.

The NAS read data-path 114 begins at the DAS devices 108 and leads to the NAS server 106. The read data-path 114 continues through the NAS server 106, across the LAN 104, to the NAS clients 102. Conversely, the NAS write data-path 116 begins at the NAS clients 102 and traverses through the LAN 104 to the NAS server 106. The NAS server 106, in turn, writes across the channel interface link 112 to the DAS devices 108.

SAN-Based Distributed Files Systems

Distributed file system designs that use SAN technologies have followed a different evolutionary path. Instead of storing data on storage devices connected directly to computers, SAN-based designs store data on SAN-attached devices shared among several client computers. SAN-based designs have high-bandwidth, low-latency data-paths between clients and devices.

SAN-based file systems require arbitration for the storage devices and consistency management of any data cached on the clients. Consistency mechanisms are either centrally located or distributed within the system. The consistency mechanisms may include software running on computers, hardware mechanisms attached to the networks, or a combination of both hardware and software.

There are two distinct SAN-based file system designs. The first design uses private file managers, in which client computers independently access metadata and real-data directly from the storage devices. Private file manager schemes do not require dedicated servers, since all necessary data is taken directly from the SAN-attached devices. With private file manager designs, clients only service local file requests. Examples of such systems include the Cray Research Shared File System, the Digital Equipment Corporation VAXcluster,™ and the Global File System from the University of Minnesota.

As a result of their designs, clients utilizing private file managers remain independent from the failures and bottlenecks of other clients. Similarly, client resources such as memory, CPUs, and bus bandwidth are not spent servicing requests from other clients. However, private file manager designs have several disadvantages. First, the designs can only support a primitive form of caching. Clients may only access data cached locally in memory or data stored on the SAN-attached devices; data cached in the memory of other clients is not accessible. The second disadvantage deals with complications encountered during failure recovery. Since clients are not aware of other clients, clients must indirectly determine data corruption caused by other client failures.

The second type of SAN-based distributed file system design utilizes file manager server computers. These file servers manage file system namespace and metadata. SAN clients make requests to the SAN servers, and the servers determine the location of real-data on SAN devices by examining and modifying file metadata. Once the location is determined, the servers either initiate transfers between clients and storage devices or inform the clients how to invoke the transfers. Servers must maintain and store metadata, manage real-data, and control transfers between clients and storage devices. These SAN-based file server designs suffer from many of the same difficulties as NAS architectures. The server design is complex, since servers need to provide a great deal of functionality. Servers that fail or become overworked tend to disrupt file system operation. The SANergy file system from Tivoli Systems, the CentraVision File System (CVFS) from Advanced Digital Information Corporation (ADIC), and the Celerra HighRoad multiplex file system (MPFS) from EMC Corporation are examples of SAN-based file systems that utilize SAN server file managers to facilitate file transfers between SAN devices and SAN clients.

FIG. 2 illustrates the data-paths and components of a typical, prior art SAN-based file sharing environment 120. SAN clients 122 are connected to the SAN server 124 via network-based I/O interface links 110 connected to the LAN 104. The LAN 104 consists of network components such as routers, switches, and hubs. Typically only control and consistency information passes across the LAN 104. In some SAN-based file system designs, the SAN server 124 and the LAN 104 are unnecessary. In other designs, the SAN-based file system may actually utilize the services of a NAS-based file system to pass control information between the servers 124 and clients 122. Regardless of the control data-path, SAN clients 122 access all real-data via SAN protocols.

The SAN clients 122 and the SAN server 124 connect to the SAN-attached devices 126 via channel-based I/O interface links 130 capable of transferring storage protocols over network connections. As with the LAN links 110, the channel links 130 include one or more physical connections. The I/O interface 130 links connect to the SAN 128, which consists of network components such as routers, switches, and hubs. The SAN 128 may also include components that perform storage virtualization, caching, and advanced storage management functions. The SAN-attached devices 126 are typically block addressable, non-volatile storage devices. SAN-attached devices 126 may also support object-addressable interfaces. SAN-attached devices 126 often have multiple ports that connect via channel links 130 to the SAN 128.

The SAN read data-path 132 begins at the SAN devices 126, passes across the SAN 128, and leads to the SAN clients 122 and the SAN server 124. The SAN write data-path 134 begins at the SAN clients 122 and the SAN server 124 and passes through the SAN 128 to the SAN-attached devices 126.

SAN-Based File Sharing Using Local File Systems

Local file systems may be used in SAN file sharing environments 120 under various restrictions. For instance, most local file system volumes may be mounted by multiple SAN clients 122 as long as all clients 122 mount the volume in read-only mode. Since the volume does not change, caching performed by the clients 122 does not affect the state of the SAN environment 120. When files of the volume need to be modified, however, all clients 122 must unmount the volume and then one client 122 re-mounts the volume in read-write mode. This client 122 makes the appropriate modifications and then unmounts the volume. Finally, all clients 122 re-mount the volume in read-only mode. This scheme promotes high-speed file sharing yet is tremendously restrictive and inefficient with respect to modifying volumes.

Some local file systems are specifically designed to support SAN file sharing environments 120 where one SAN client 122 mounts the volume in read-write mode and all other SAN clients 122 mount the volume read-only. These SAN-based local file system must frequently flush dirty caches on the read-write client 122 and regularly invalidate stale caches on the read-only clients 122. Given that only one computer is capable of modifying the volumes, this solution lacks transparency required by most applications and thus possess limited usefulness.

SAN Clients That Serve NAS Clients

A SAN-based file sharing environment 120 may be configured to serve a large number of NAS client computers 102 using NAS file sharing protocols. SAN clients 122 act as NAS servers 106 that serve volumes stored on the SAN-attached devices 126 to a large number of NAS clients 102 connected to the NAS servers 106 though LANs 104. Such systems, also known as clusters, combine SAN and NAS technologies into a two tiered scheme. In effect, a NAS cluster can be viewed as a single, large NAS server 106.

SAN Appliances

SAN appliances are prior art systems that consist of a variety of components including storage devices, file servers, and network connections. SAN appliances provide block-level, and possibly file-level, access to data stored and managed by the appliance. Despite the ability to serve both block-level and file-level data, SAN appliances do not possess the needed management mechanisms to actually share data between the SAN and NAS connections. The storage devices are usually partitioned so that a portion of the available storage is available to the SAN 128 and a different portion is available for NAS file sharing. Therefore, for the purpose of this application, SAN appliances are treated as the subsystems they represent.

FIG. 3 illustrates an example of a SAN appliance 136 that possess an internal SAN 138 that shares data between SAN-attached devices 126, the NAS server 124, and the SAN 128 external to the appliance 136. The appliance 136 serves block-level data, through channel-based interface links 130, to the SAN 128. From the perspective of the SAN, the appliance 136 appears as a prior art SAN-attached device 126. The appliance 136 also serves file-level data, through network-based interface links 110, to the LAN 104. From the perspective of the LAN, the appliance 136 appears as a prior art NAS server 124.

Another adaptation of a SAN appliance is simply a general purpose computer with DAS devices. This computer converts the DAS protocols into SAN protocols in order to serve block-level data to the SAN 128. The computer may also act as a NAS server 124 and serve file-level data to the LAN 104.

File System Layering

File system designers can construct complete file systems by layering, or stacking, partial designs on top of existing file systems. The new designs reuse existing services by inheriting functionality of the lower level file system software. For instance, NFS is a central-server architecture that utilizes existing local file systems to store and retrieve data from storage device attached directly to servers. By layering NFS on top of local file systems, NFS software is free from the complexities of namespace, file attribute, and storage management. NFS software consists of simple caching and transport functions. As a result, NFS benefits from performance and recovery improvements made to local file systems.

Other examples of file system layering include adding quota support to existing file system, strengthening consistency of cached data in an existing distributed file system, and adding compression or encryption to file systems without such support.

Installable File System Interfaces

Most modern operating systems include installable file system interfaces to support multiple file system types within a single computer. In UNIX, the Virtual File System (VFS) interface is an object-oriented, installable interface. While several UNIX implementations incorporate VFS, the interfaces differ slightly between platforms. Several non-UNIX operating systems, such as Microsoft Windows NT, have interfaces similar to VFS.

VFS occupies the level between the system call interface and installed file systems. Each installed file system provides the UNIX kernel with functions associated with VFS and vnode operations. VFS functions operate on whole file systems to perform tasks such as mounting, unmounting, and reading file system statistics. Vnode operations manipulate individual files. Vnode operations include opening, closing, looking up, creating, removing, reading, writing, and renaming files.

Vnode structures are the objects upon which vnode functions operate. The VFS interface creates and passes vnodes to file system vnode functions. A vnode is the VFS virtual equivalent of an inode. Each vnode maintains a pointer called "v_data" to attached file system specific, in-core memory structures such as inodes.

Many file system interfaces support layering. With layering, file systems are capable of making calls to other file systems though the virtual file system interface. For instance, NFS server software may be implemented to access local file systems through VFS. In this manner, the server software does not need to be specifically coded for any particular local file system type; new local file systems may be added to an operating system without reconfiguring NFS.

SUMMARY OF THE INVENTION

The present invention is a distributed file system that utilizes aspects of a NAS server system along with a storage area network having at least one SAN-attached storage device. By combining these two architectures, it is possible to achieve the benefits of fast data reads over a SAN as well as some of the consistency benefits of using a NAS server. The present invention combines these two architectures by creating separate data paths for write and read requests.

The write data-path of the present invention is similar to the write data-path of prior art NAS, with the DAS storage device being replace with a SAN-attached storage device accessed over a SAN. This is accomplished so that all write activities to the SAN attached storage device are serialized through one server, while still allowing each client write access to the volume stored on the SAN-attached device.

The primary read data-path of the present invention is similar to the read data-path of prior art SAN environments, whereas the secondary read data-path is similar to the read data-path of prior art NAS environments. Since most reads pass directly from the SAN-attached storage device to the clients, the present invention takes full advantage of high-speed SAN protocols. In those rare instances where the primary read data path is not available, the present invention can utilize the secondary data path of typical NAS environments.

The present invention is able to maintain consistency between the local and remote file system layers by comparing modification times for files and related directories, such as is accomplished during file lookup. To perform a lookup operation, the present invention requests that the remote file system lookup the file. If this is successful, the present invention then compares the modification times for the lookup directory in both the local and remote file systems. If these times are not the same, the local file system cache for the directory is invalidated, and the directory inode for the local file system is read again from the SAN-attached device. A lookup is then performed through the local file system. If this is unsuccessful, the system will note that reads for this file should occur through the remote file system.

Similarly, consistency is maintained during read operations by examining the modification times for the file in both the remote and local file systems. If the times are the same, then the local file system is used to read the file. If the times differ, the local file system cache is invalidated and the modification time is then read from the storage device and again compared. If the modification times remain different, then the remote file system is used to read the file. If the modification times are the same, the local file system is used to read the file. In some cases, it may be necessary to flush the cache in the remote file system before performing the read operation with the local file system.

In a first embodiment of the present invention, a new file system is loaded into each client. This file system is layered on top of separate local and remote file systems, which handle actual data transfers over the SAN and actual data transfers with the NAS server. No modification of the file systems of the NAS server is necessary in this embodiment.

In a second embodiment, the file system of the present invention is merged with a local file system. In this embodiment, this combined file system is used on the client in conjunction with a remote file system that handles communication with the NAS server. The new, combined file system is also used on the NAS server as the local file system. By using this combined data system, this second embodiment ensures that all clients and servers accessing the SAN-attached devices will be able to coexist.

In a third embodiment, the file system of the present invention is merged with a local file system and given support to write directly to the SAN-attached devices. In this embodiment, the client coordinates with the server to maintain consistency while updating on-disk inodes and block allocate tables. The client has multiple options concerning which data-path to transfer data; however, in a common scenario, the client transfers small files and small file requests across the LAN using NAS protocols and transfers large files and large file requests across the SAN using SAN protocols.

BRIEF DESCRIPTION OF THE DRAWINGS

FIG. 9 is a flowchart showing the basic procedure of the present invention for writing to a file.

DETAILED DESCRIPTION OF THE INVENTION

The present invention is a distributed file system that provides users and application programs with transparent access to shared data found on storage devices attached directly to a network. For purposes of this application, the present invention will be referred to as the Nasan file system. This file system incorporates two technologies into a single file system: network attached storage (NAS) and storage area networks (SANs).

Figure 1:
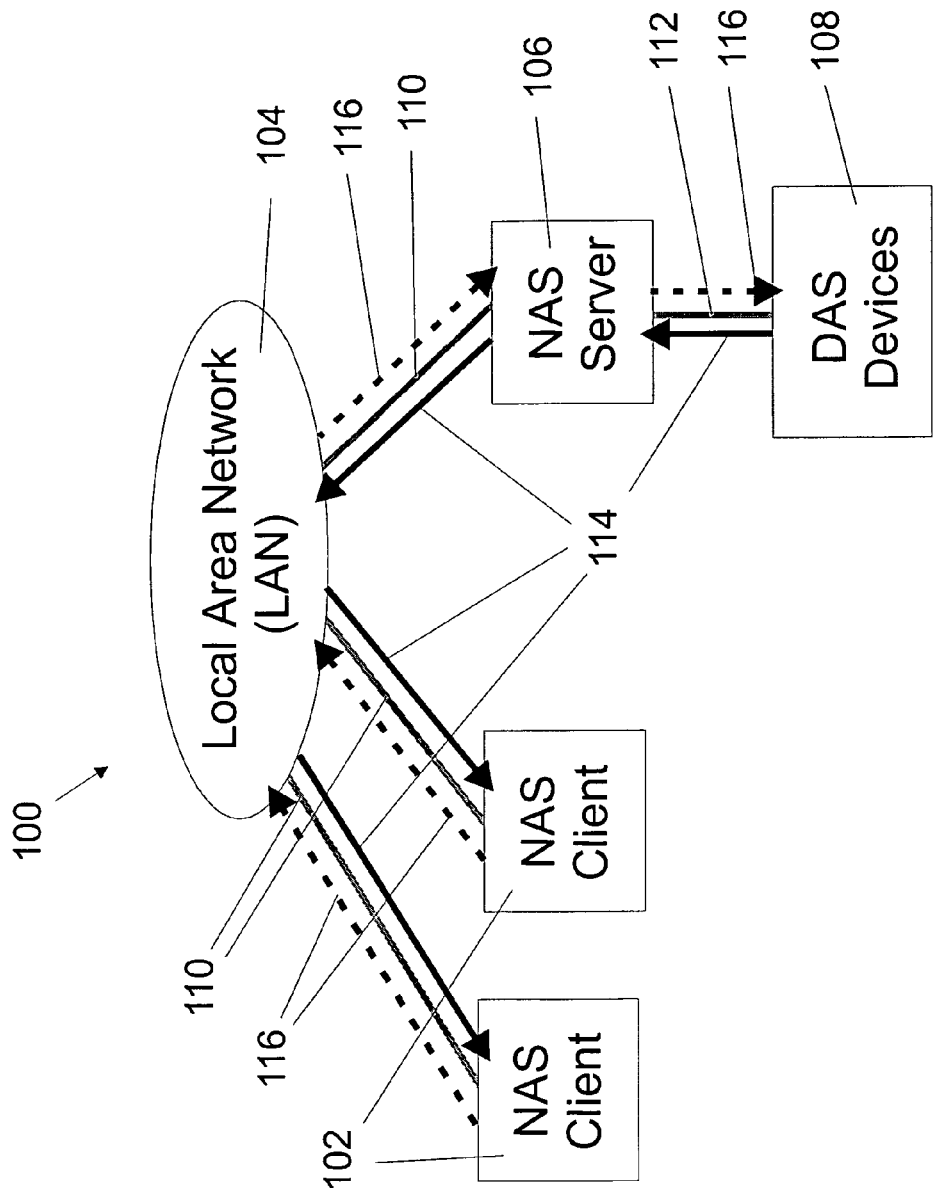
FIG. 1 is a representational drawing of a prior art NAS-based file sharing environment.
Figure 2:
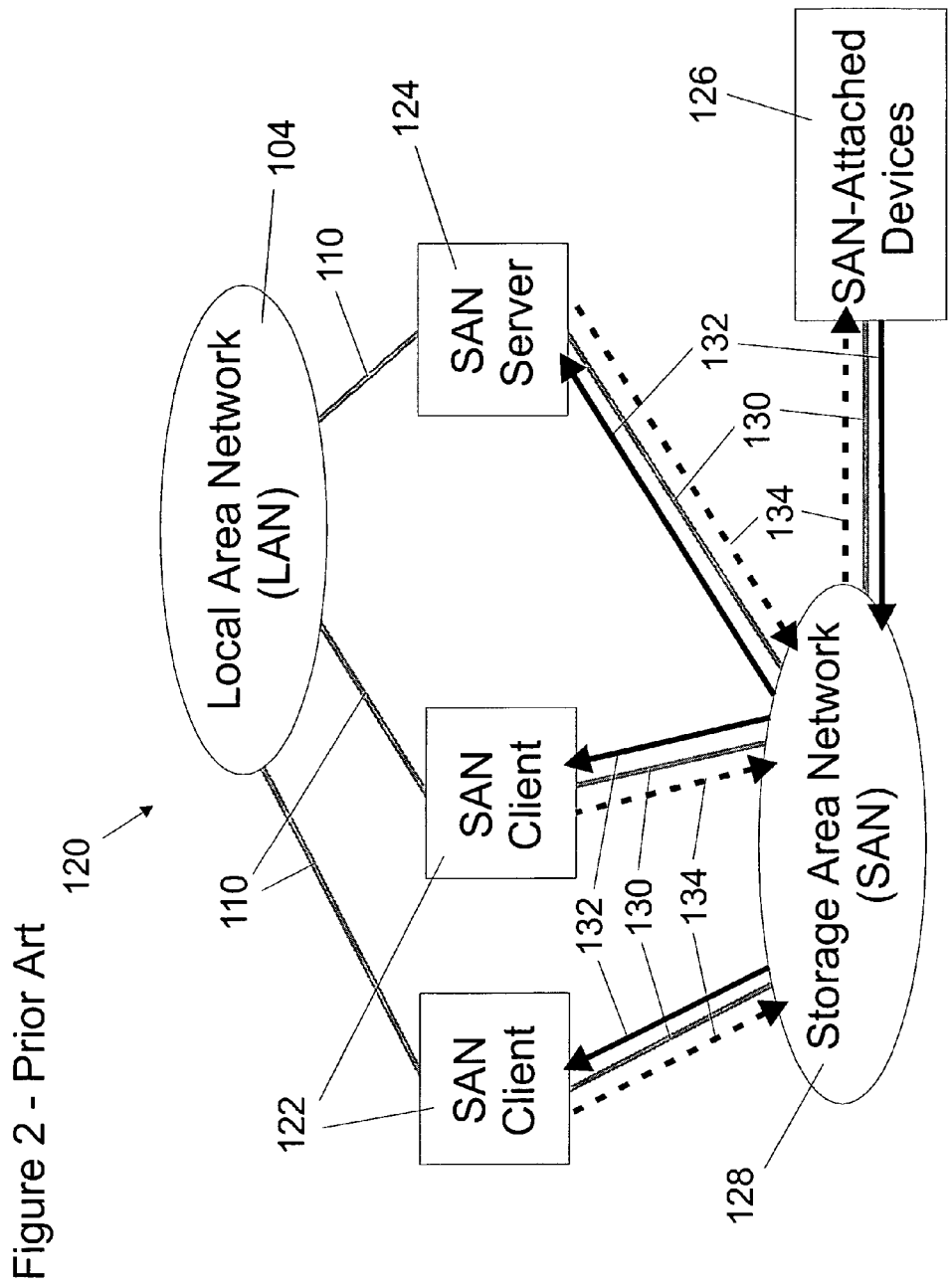
FIG. 2 is a representational drawing of a prior art SAN-based file sharing environment.
Figure 3:
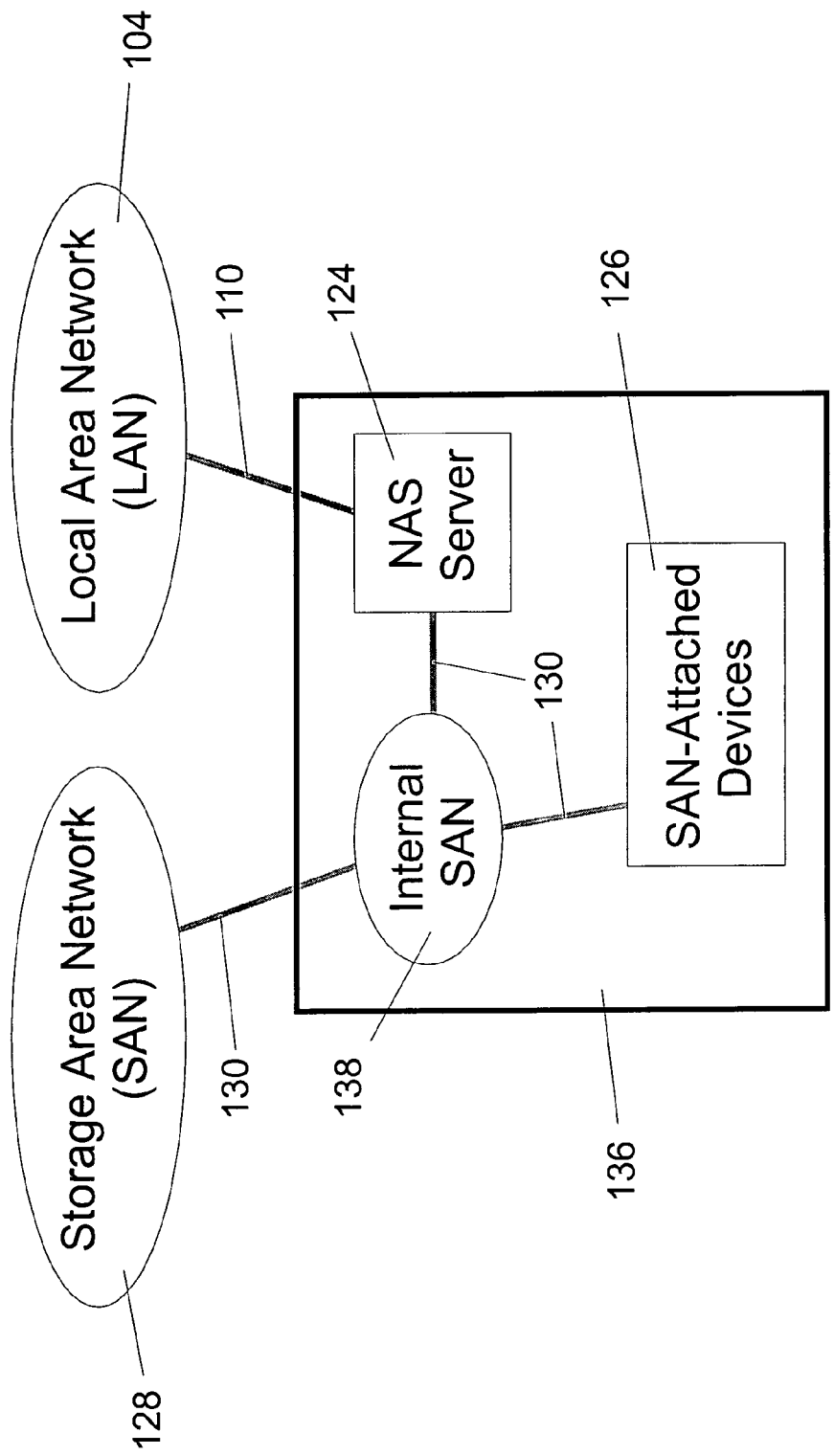
FIG. 3 is a representational drawing of a prior art SAN appliance.
Figure 4:
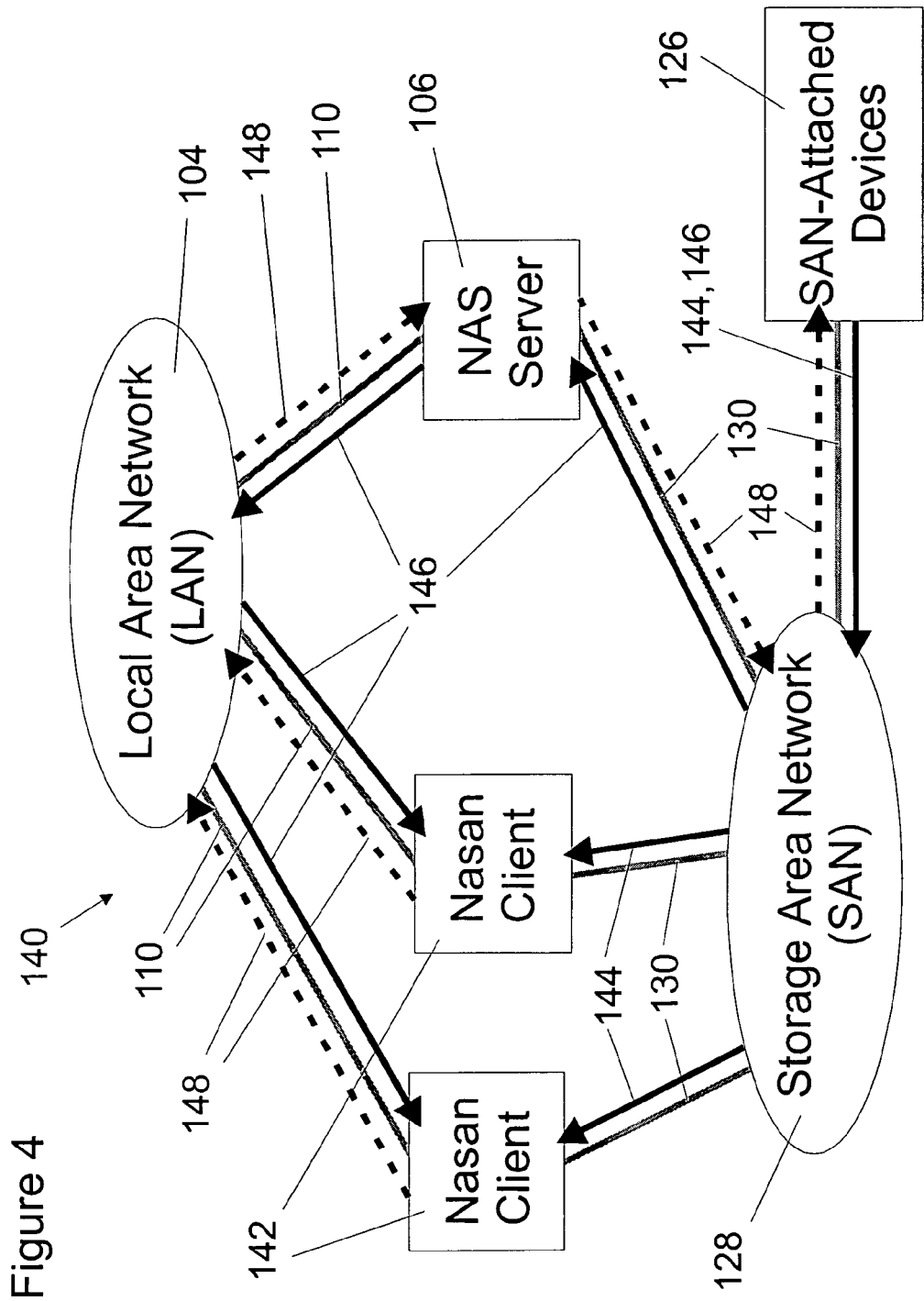
FIG. 4 is a representational drawing of a file sharing environment utilizing a file system of the present invention.

Referring to FIG. 4, a file sharing environment 140 is shown that utilizes a file system of the present invention. A Nasan environment 140 consists of Nasan client computers 142, SAN-attached devices 126, and at least one NAS server 106. Nasan clients 142 are connected to the NAS server 106 via network-based I/O interface links 110 connected to the LAN 104. The LAN 104 consists of network components such as routers, switches, and hubs.

The Nasan clients 142 and NAS server 106 connect to the SAN-attached devices 126 via an I/O interface capable of transferring storage protocols over network connections. The NAS server 106 may actually be comprised of a cluster of computers serving file-level data via NAS protocols. The NAS server 106 may also be part of the file server component of a SAN appliance 136.

The I/O interface links 130 connect to the SAN 128, which consists of network components such as routers, switches, and hubs. The SAN 128 may also include components that perform storage virtualization, caching, and advanced storage management functions. The SAN devices 126 are block and object-addressable, non-volatile storage devices. The SAN devices 126 may be part of a SAN appliance 136 or dedicated storage devices attached to the SAN 128.

The primary read data-path 144 of Nasan is similar to the read data-path 132 of prior art SAN environments 120, whereas the secondary read data-path 146 is similar to the read data-path 114 of prior art NAS environments 100. The majority of read transfers take place over the primary data-path 144, which passes from the SAN devices 126, through the SAN 128, directly to the Nasan clients 142. The primary data-path 144 takes full advantage of high-speed SAN protocols. However, some read transfers follow the secondary data-path 146 and pass from the SAN-attached devices 126, through the NAS server 106, across the LAN 104, en-route to the Nasan clients 142. The state of the Nasan environment 140 dictates whether the primary data-path 144 or the secondary data-path 146 is used for read transfers.

The write data-path 148 of Nasan is similar to the write data-path of prior art NAS 116 with the difference being the Nasan write data-path 148 also includes the SAN 128. The write data-path 148 begins at the Nasan clients 142 and passes through the LAN 104 to the NAS server 106. The server 106, in turn, writes across the SAN 128 to the SAN-attached devices 126.

Due to high-speed SAN reads 144, the Nasan file system significantly exceeds the file sharing performance and scalability of prior art NAS solutions. Although Nasan write performance is similar to prior art NAS write performance, Nasan reads are often ten times faster. Because read operations generally outnumber writes five to one, the performance improvement made to reads dramatically increases overall system throughput. Furthermore, by offloading reads from the NAS servers 106, the Nasan file system substantially reduces server 106 workloads. With reduced workloads, servers 106 exhibit shorter response times, sustain more simultaneous file transfers, and support considerably larger throughputs than servers 106 supporting traditional NAS 100.

The Nasan file system transfers read requests across the high-speed SAN 128 while serializing writes through a central NAS server 106. This serialization leads to write transfer rates that are slower than reads; however, write-serialization facilitates extremely low-latency consistency management. Low-latency consistency enables Nasan clients 142 to efficiently transfer files of all sizes. Therefore, the Nasan file system is a general-purpose solution for read-intensive workloads.

Nasan Layering

One embodiment of the Nasan file system utilizes a two-tiered layering scheme. Nasan software occupies the upper level, while non-modified local and remote file systems comprise the lower. The Nasan layer provides a management framework that facilitates data consistency and routes file requests to the appropriate lower level file system. All remaining file management functionality is derived from these lower layer file systems.

Figure 5:
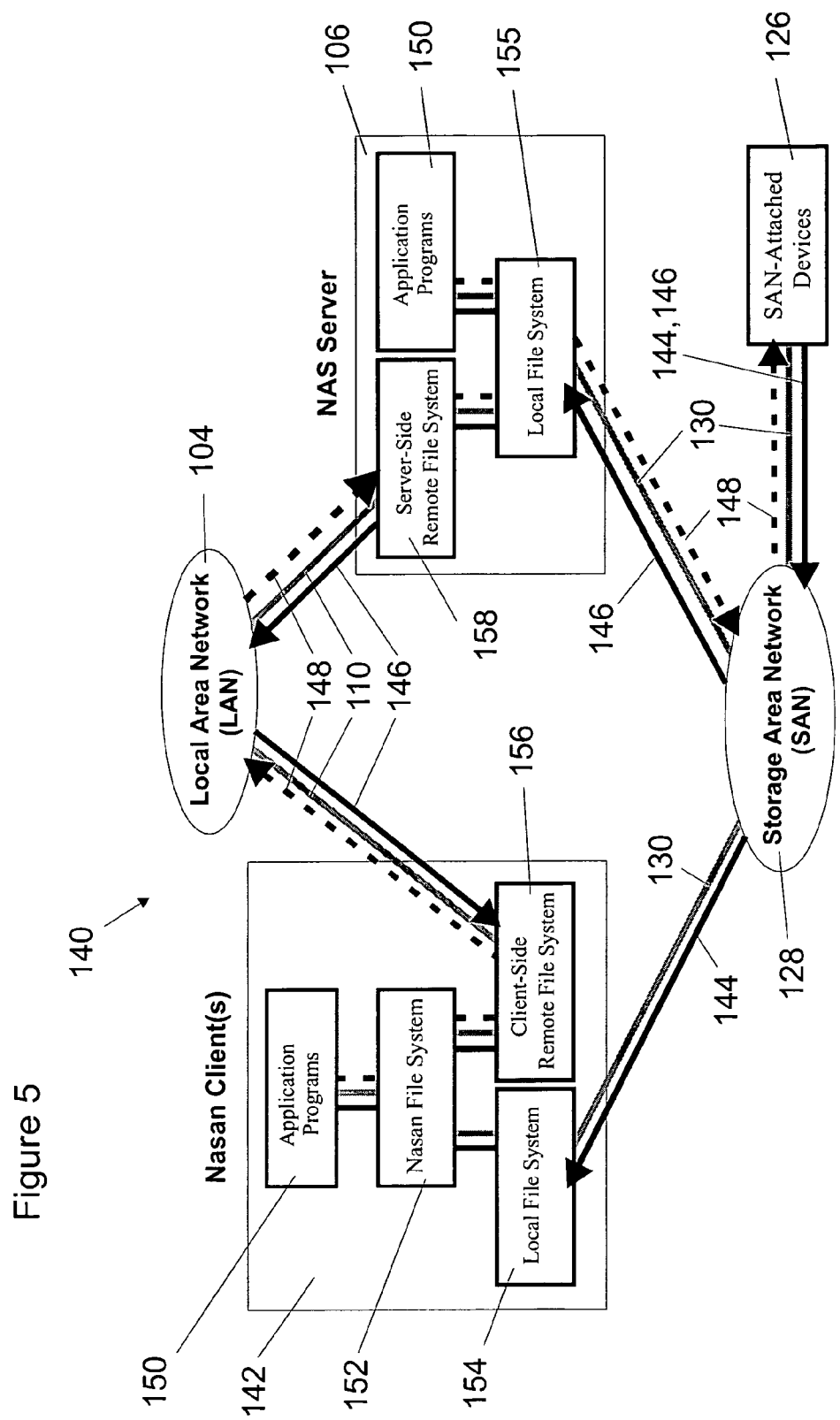
FIG. 5 is a representational drawing of the network environment of FIG. 4, showing additional details of the client and server elements.

Referring to FIG. 5, application programs 150 running on the Nasan client 142 make file requests to the Nasan file system software layer 152. Nasan software 152 redirects read requests to the either the local file system level 154 or the client-side remote file system layer 156 and redirects write requests to the remote file system layer 156. These lower layer file systems conduct the actual data management, transport, and storage.

The local file system 154 of the client provides the primary read data-path 144 for Nasan transfers. Because the clients 142 do not directly modify the volume stored on the SAN devices 126, Nasan software 152 maintains low-latency consistency by simply invalidating stale caches of the local file system layer 154.

The remote file system facilitates the secondary read data-path 146 as well as write access to files managed by the NAS server 106. The Nasan client 142 passes file requests to the client-side remote file system layer 156. In turn, the remote file system 156 on the client 142 transmits these requests via NAS protocols to the server-side remote file system layer 158 on the server 106. The NAS server 106 completes the requests by reading data from or writing data through the local file system 155 of the server 106 to volumes stored on SAN-attached devices 126. Write-serialization, through the NAS server 106, enables low-latency consistency.

Components of the Preferred Embodiment

The components and protocols that form the environment 140 of the present invention range in price, performance, and compatibility. In the preferred embodiment, the interface links 110,130 that connect to the LAN 104 and to the SAN 128 may include Ethernet, InfiniBand, and Fibre Channel. Over these links 110,130 run a number of different network and channel protocols, including Internet Protocol (IP), SCSI-3, Virtual Interface (VI), iSCSI, FCIP, and iFCP. The NAS protocols used by the remote file system 156,158 include Network File System (NFS), Server Message Block (SMB), and Common Internet File System (CIFS). The present invention is not limited to these specific components and protocols.

Local File System Consistency

In general, local file systems perform extensive metadata and real-data caching. The only consistency management typically required of local file systems is periodic updates to on-disk data structures. Cached data is never invalidated because on-disk data is always assumed to be older than cached data.

Within a Nasan environment 140, the NAS server 106 has read-write access to the local file system volume stored on SAN-attached disks 126, while Nasan clients 142 have read-only access to this volume. Because the client local file systems 154 and the server local file systems 155 may not be designed to support SAN environments with multiple computers, Nasan software 152 must explicitly maintain data consistency between storage devices 126 and caches of the client local file system 154.

Consistency Between Local and Remote File System Layers

Local 154 and remote 156 file systems utilize separate caches within client 142 main memories. After file writes, the remote file system 156 cache contains newer data than the local file system 154 cache. Nasan software 152 makes the local file system 154 cache consistent with the Nasan environment 140 by explicitly invalidating stale data within the cache.

Nasan software 152 has the option to read from the local file system 154 or the remote file system 156. When reading from the primary data-path 144, Nasan software 152 first determines if data is being cached by the client-side remote file system 156. If data is cached, Nasan software 152 flushes the remote file system 156 cache and invalidates the local file system 154 cache. The read operation continues by reading file data from the local file system layer 154.

Nasan software 152 reads from the secondary data-path 146 when the local file system 154 inode is temporarily inconsistent with inode of the remote file system 156. Nasan software 152 may also read from the secondary data-path 146 when performance benefits are possible. For example, if the client 142 has recently written to the file, the remote file system 156 cache likely contains a cached copy of the most recently written data. In this particular case, reading from the secondary data-path 146 will benefit from the enhanced performance of the cache. However, if a different client 142 writes to the file before the read is requested, the cached data is no longer valid, and therefore the read will propagate across the LAN 104 to the NAS server 106.

Another example of when the Nasan file system 152 may read from the secondary data-path 146 rather than the primary data-path 144 relates to the size of the read request and the size of the file. For small files or small read requests, read transfer times may actually be smaller when reading from the remote file system 156, because reading from the primary data-path 144 entails reading metadata and real-data from the local file system 154.

Inode Structure

The VFS interface of a Nasan client 142 maintains a vnode structure in memory for each active Nasan file. These vnodes are passed to Nasan software 152 functions such as lookup, read, write, create and remove. The Nasan functions, in turn, use the v_data field of the vnode to store and locate the in-core Nasan inode of the specific file.

Figure 6:
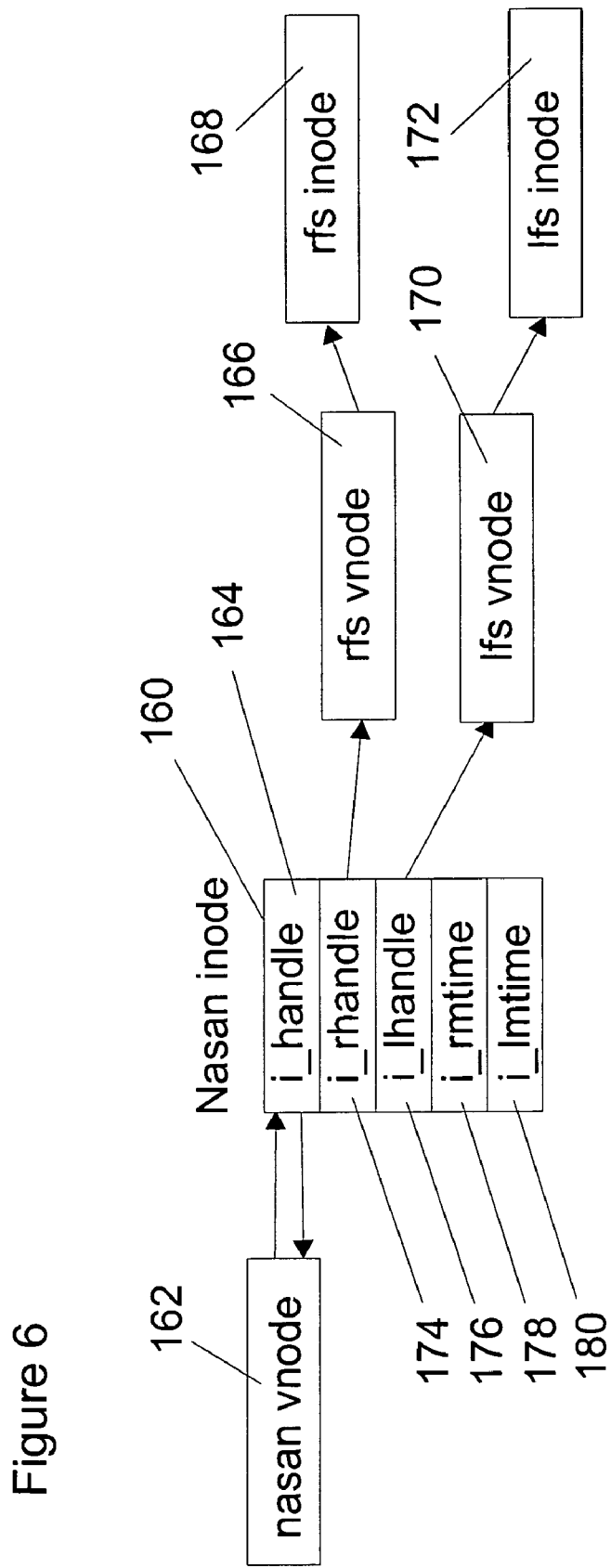
FIG. 6 is a representational drawing of an in-core inode structure of the present invention.

FIG. 6 illustrates the primary fields found within an in-core Nasan inode 160 structure as well as pointers to closely related data structures within the main memory of the client 142. The i_handle 164, i_rhandle 174 and i_lhandle 176 fields point to the Nasan vnode 162, the remote file system vnode 166, and the local file system vnode 170, respectively. These vnodes, 162, 166, and 170, point to their corresponding file system specific inodes 160, 168, and 172 through the v_data pointer field of each vnode. In situations where the remote file system layer 156 and local file system layer 154 are inconsistent, Nasan software 152 may set the i_lhandle 176 field to point to the remote file system vnode 166 rather than the local file system vnode 170. This situation is temporary but signifies to Nasan software 152 that the remote file system layer 156 should be accessed for all operations of the corresponding file. The i_rmtime 178 and i_lmtime 180 fields maintain the last know file modification times returned by the remote file system layer 156 and the local file system layer 154, respectively.

Basic File System Operations

The basic file system operations are searching for a file within a directory, reading from a file, and writing to a file. Other operations include reading a directory, creating a file, removing a file, retrieving file attributes, modifying file attributes, and locking a file.

File Lookup

A lookup is a common file system operation that searches a directory for a given file name. If the lookup function locates the file within the directory, the function returns a vnode pointer for the corresponding file.

Figure 7:
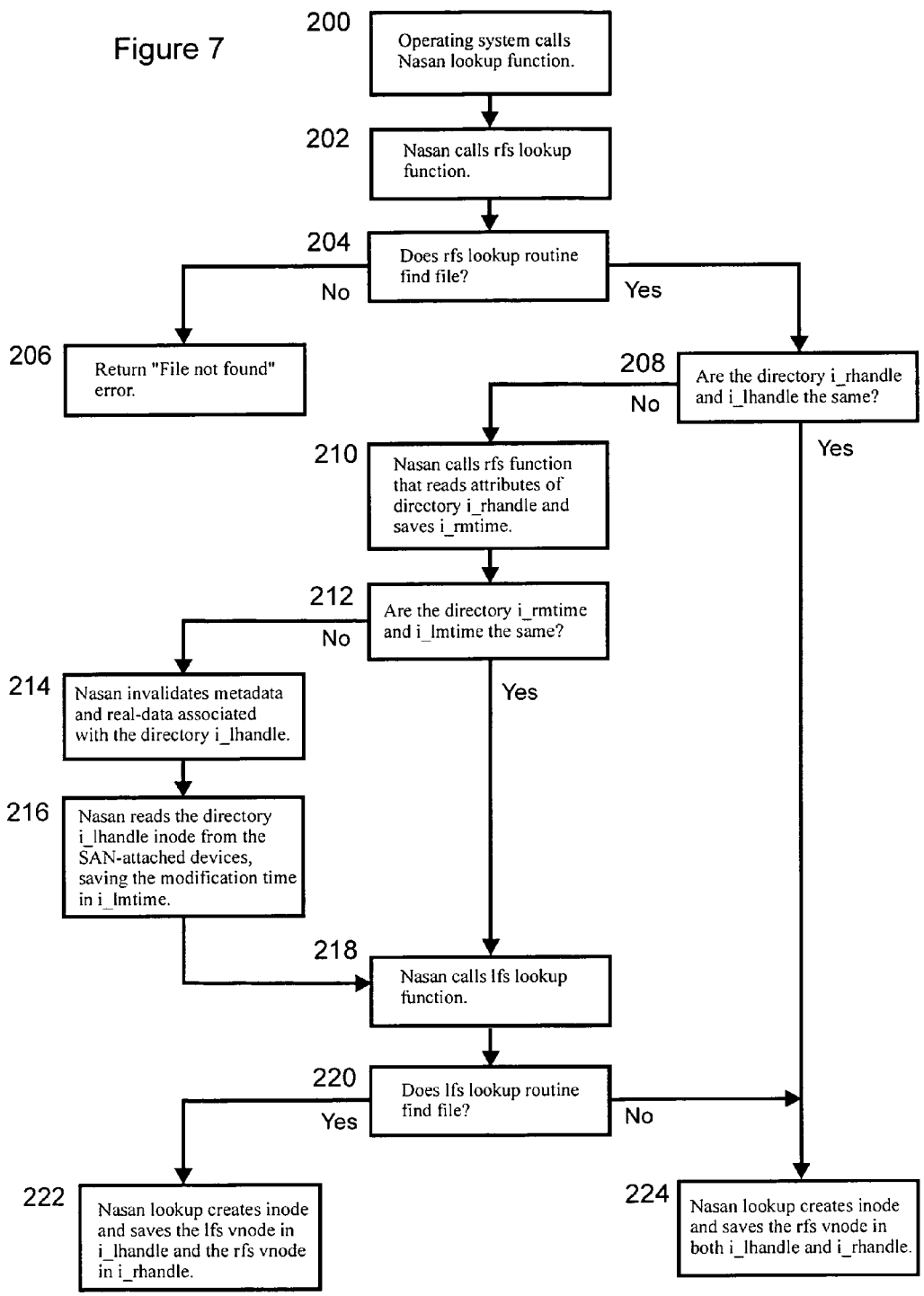
FIG. 7 is a flowchart showing the basic procedure of the present invention for locating a file within a directory.

The lookup operation of the present invention is illustrated in the flowchart shown in FIG. 7. A lookup operation receives as arguments the directory vnode 162 and the name of the file for which to search, and returns a newly created vnode 162 and inode 160 combination for the found file. The process starts at step 200 by the operating system of a Nasan client 142 invoking the Nasan lookup function with the appropriate arguments. At step 202, the Nasan lookup function calls the lookup routine of the remote file system layer 156 using i_rhandle 174 as the directory vnode argument. If the file is not found by the remote file system 156, at step 206 the Nasan lookup exits with a "file not found" error.

If the file is found, it is necessary to determine if the found file is available through the local file system 154. The first step for accomplishing this task is step 208, which compares the lower-level vnode pointers, i_rhandle 174 and i_lhandle 176, of the directory. If these pointers are identical, the function proceeds to step 224, because the directory inode does not contain a pointer to the local file system vnode 170. This indicates that the directory in which the file is being searched is not presently available through the local file system 154.

If the lower-level vnode pointers of the directory, i_rhandle 174 and i_lhandle 176, are not the same, Nasan lookup continues to step 210 which calls the remote file system 156 function that reads file attributes of the directory and then saves the file modification time in i_rmtime 178.

At step 212, directory inode modification times, i_rmtime 178 and i_lmtime 180 are compared. If these times are the same, the local file system 154 cache for the directory is clean, so the function proceeds to step 218. Otherwise, the cache of the local file system 154 for the directory must be invalidated in step 214 before a lookup can be performed in the directory. The actual technique for invalidating the cache associated with the directory is dependent upon the operating system of the Nasan client 142. In the preferred embodiment, directory metadata is cached in the operating system buffer cache, whereas the directory real-data is cached in the page cache. The buffer cache of the directory metadata is invalidated by explicitly marking each cached block as stale. The page cache of the directory real-data is invalidated by calling page cache invalidate routines.

At step 216, Nasan reads the local file system directory inode 172 from the SAN-attached devices 126 and saves the modification time in i_lmtime 180 of the Nasan directory inode 160. In the preferred embodiment, reading the local file system directory inode 172 merely involves calling the local file system 154 function that reads the directory attributes; the local file system layer 154 invokes the actual calls to the SAN-attached devices 126.

At step 218, the Nasan lookup function calls the lookup routine of the local file system layer 154 using i_lhandle 176 of the directory inode 160 as the directory argument. If the file is not found by the local file system 154, the Nasan lookup proceeds to step 224 which saves the vnode 166 returned by the remote file system 156 lookup routine at step 202 in both i_rhandle 174 and i_lhandle 176 fields of a newly created Nasan inode 160. The Nasan lookup routine finishes and returns control to the operating system.

If the local file system 154 lookup function finds the file at step 218, control passes to step 222 where Nasan 152 creates a new Nasan inode 160, saves the vnode 166 returned by the remote file system 156 lookup routine at step 202 in the i_rhandle 174 field of a newly created Nasan inode 160, and saves the vnode 170 returned by the local file system 154 lookup routine at step 218 in the i_lhandle 176 field. The Nasan lookup routine finishes and returns control to the operating system.

File Read

Figure 8:
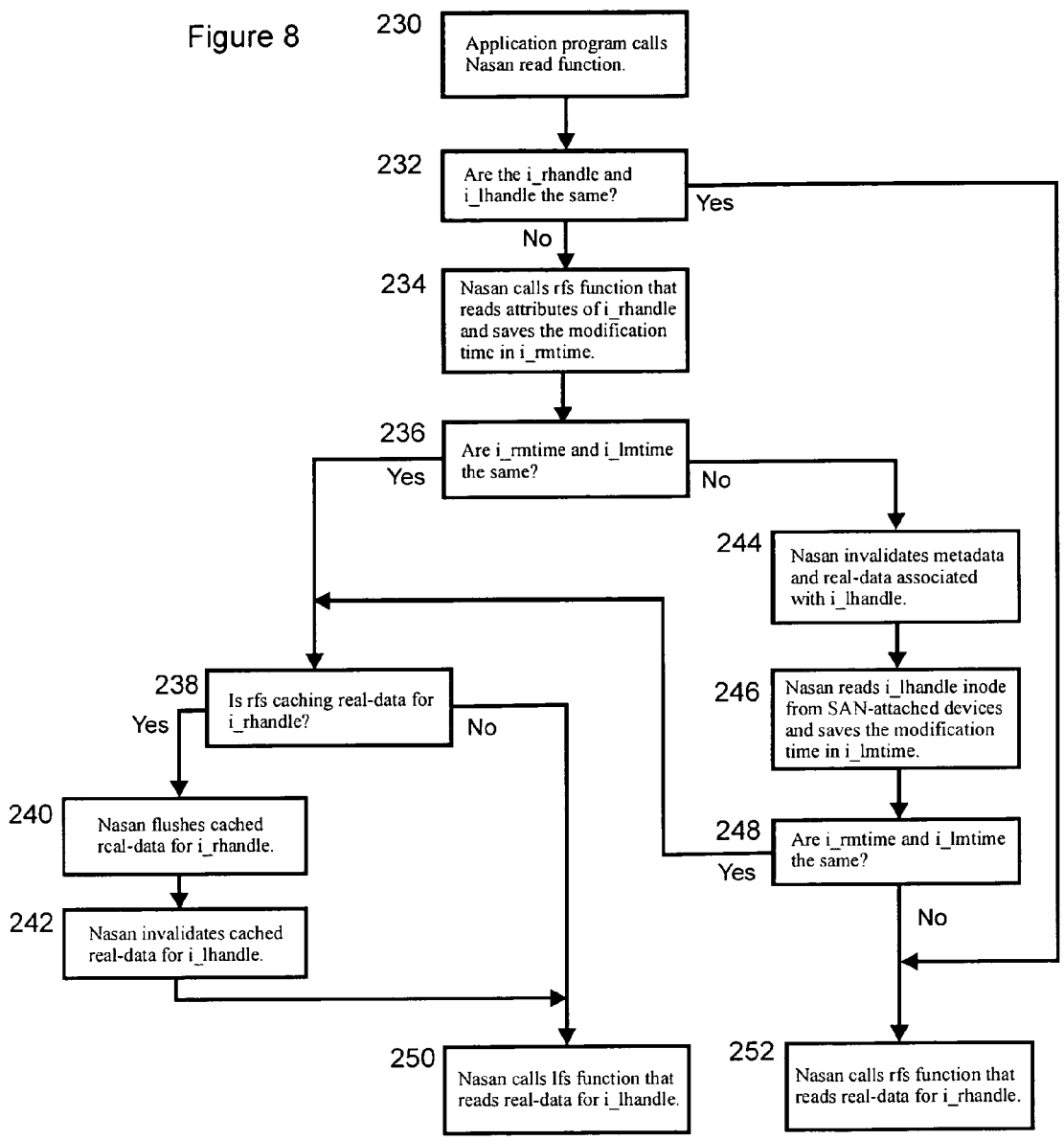
FIG. 8 is a flowchart showing the basic procedure of the present invention for reading from a file.

The file read operation of the present invention is illustrated in the flowchart of FIG. 8. The process starts by an application program 150 running on a Nasan client 142 desiring to read data from a file. The application program 150 submits the read request to the operating system, which in turn invokes a call to the Nasan, read function, as shown in step 230. At step 232, the Nasan read function tests whether the lower level vnode pointers, i_rhandle 174 and i_lhandle 176, are identical. If these pointers are the same or if Nasan otherwise selects to read from the secondary data-path 146, the Nasan read function at step 252 invokes a call to the client-side remote file system layer 156, which in turn reads data from the NAS server 106 across the LAN 104.

If i_rhandle 174 and i_lhandle 176 are different, at step 234, the Nasan read function calls the remote file system 156 function that reads file attributes and saves the modification time of the file within i_rmtime 178 of the inode 160. At step 236, the Nasan read function compares the newly acquired modification time with the saved modification time within i_lmtime 180. If the modification times of i_rmtime 178 and i_lmtime 180 are the same, step 238 is performed; otherwise, control proceeds to step 244.

At step 238, the Nasan read function checks whether the client-side remote file system layer 156 is caching real-data. If data is being cached, Nasan flushes dirty data from the cache for the remote file system 156 and invalidates any real-data cached by the local file system layer 154. The flush operation ensures that data last written by the client 142 will be written to the SAN-attached devices 126 prior to reading from the local file system 154. If data is not cached, flow proceeds to step 250.

At step 244, because the modification times of i_rmtime 178 and i_lmtime 180 differ, it is necessary to invalidate the cache of the local file system 154 associated with the file. This is accomplished in the preferred embodiment by explicitly marking the appropriate metadata blocks within the buffer cache as stale and invalidating real-data within the page cache by calling page cache invalidation routines.

At step 246, Nasan 152 reads the local file system inode 172 from the SAN-attached devices 126 and saves the modification time within i_lmtime 180 of the inode 160. In the preferred embodiment, reading the local file system inode 172 merely involves calling the local file system 154 function that reads the file attributes; the local file system layer 154 invokes the actual calls to the SAN-attached devices 126.

At step 248, if the modification times of i_rmtime 178 and i_lmtime 180 are the same, control proceeds to step 238. Otherwise, the Nasan read function at step 252 invokes a call to the client-side remote file system layer 156, which in turn reads data from the NAS server 106 across the LAN 104.

At step 250, the Nasan read function invokes a call to the local file system layer 154, which in turns reads data from the SAN-attached devices 126 across the SAN 128.

File Write

The file write operation of the present invention is illustrated in the flowchart of FIG. 9. The process starts by an application program 150 running on a Nasan client 142 desiring to write data to a file. The application 150 submits the write request to the operating system, which in turn invokes a call to the Nasan write function, as shown in step 260. At step 262, the Nasan write function passes the request to the write function of the client-side remote file system layer 156. The Nasan write completes after the remote file system 156 function completes.

File Close

The operating system of the Nasan client 142 calls the Nasan close operation when an application program 150 is finished using a file. The Nasan close function simply calls the close function of the local file system 154 and the close function of the client-side remote file system 156. The client-side remote file system 156 performs a synchronous flush operation of its cache. This flush operation writes the dirty cached data to the NAS server 106 and completes after the NAS server 106 has written the data to the SAN-attached devices 126.

File Locks

The Nasan file system derives file locking services from the remote file system layer 156. On the clients 142, application programs 150 make lock requests to Nasan file system software 152. Nasan software 152 redirects these lock requests to the remote file system layer 156. The client-side remote file system software 156 and the server-side remote file system 158 provide all lock management, process-blocking, and recovery functionality.

Other File Operations

Other file system operations include reading a directory, creating a file, removing a file, retrieving file attributes, and modifying file attributes. Operations that modify the Nasan volume are similar to file writes in that control is passed from the Nasan 152 function to the client-side remote file system 156 function. These remote file system 156 functions perform the entire operation and then return control to the Nasan 152 function. The Nasan 152 function simply passes error information back to the operating system.

Operations that do not modify the Nasan volume may use the primary read data-path 144 or the secondary data-path 146. Operations that use the primary data-path 144 are similar to file read operations and operations that use the secondary data-path 146 are similar to file write operations. The primary data-path 144 is usually chosen by Nasan software 152 when the i_rmtime 178 and i_lmtime 180 fields of the Nasan inode 160 are identical. Otherwise, the secondary data-path 146 is used to service the file operation.

ALTERNATIVE EMBODIMENTS

Numerous alternative embodiments to the file system of the present invention are possible, while remaining within the scope of the present invention. Some embodiments may improve the performance of the file system in one or more areas. Other embodiments may improve heterogeneity, availability, and recovery. The following alternative embodiments are examples of the type of files systems that are possible utilizing the present invention.

NAS Server Layering

It is possible to run Nasan software 152 on the NAS server 106 to enable various consistency and performance optimizations. These optimizations may or may not be beneficial to various environments. On the Nasan client 142, Nasan software 152 remains layered above the local file system 154 and client-side remote file system 156. On the NAS server 106, Nasan software 152 is layered below the server-side remote file system 158 and below the application programs 150 but above the local file system 155.

Merged Layers

Figure 10:
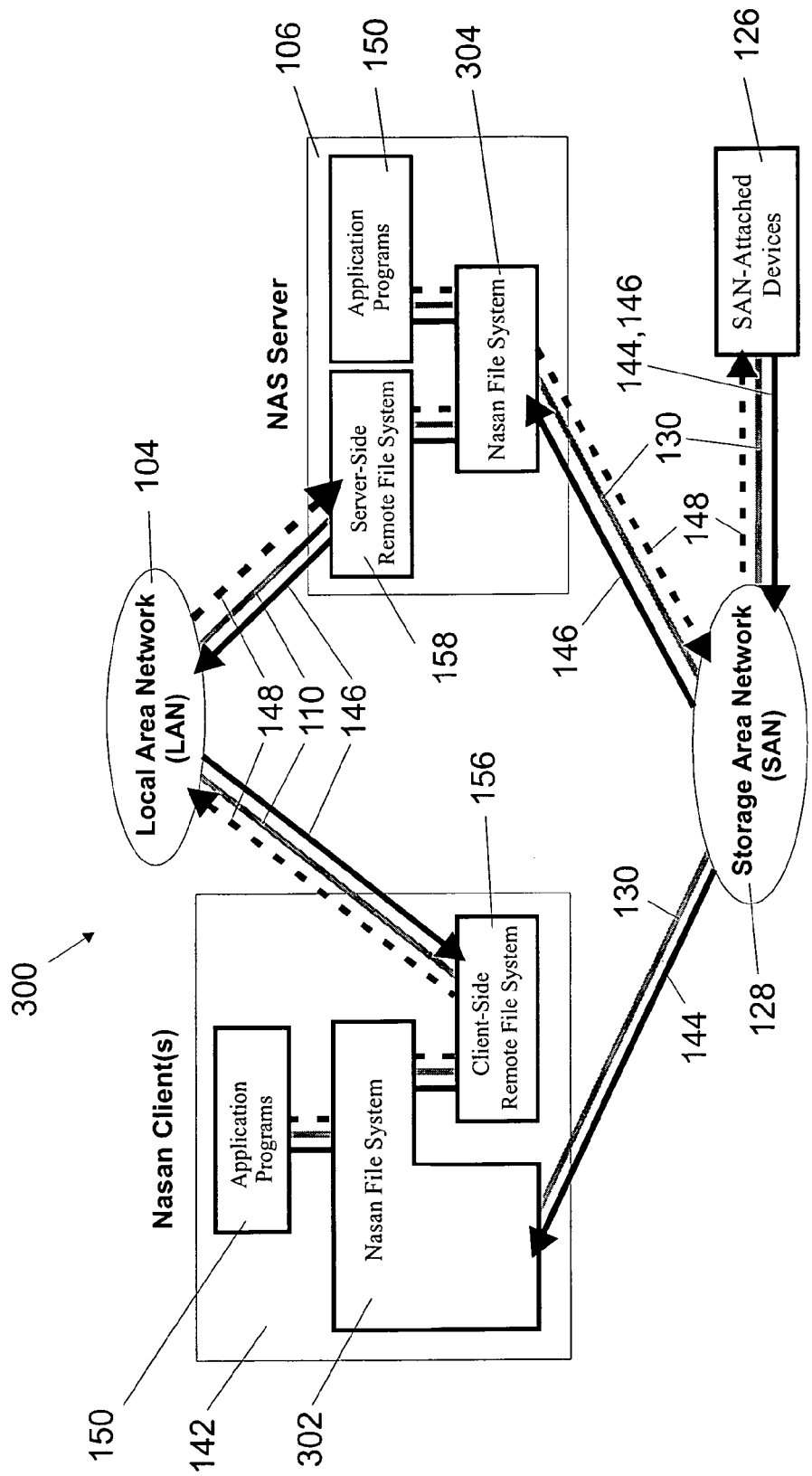
FIG. 10 is a representational drawing of the network environment of FIG. 4 with local file system layers merged into the file system of the present invention.

The Nasan clients 142 and the NAS server 106 must interpret the file system volume stored on the SAN devices 126 in exactly the same manner. However, not many local file systems 154,155 support multiple operating systems, thus Nasan is often limited to a few heterogeneous environments. FIG. 10 illustrates a system 300 in which the file system of the present invention is merged with local file system software. The system 300 is useful in that it ensures that the file systems which access the volumes stored by the SAN-attached devices interpret the volumes in the same manner, whether from the Nasan clients 142 or from the NAS Server 106, regardless of the operating systems within the system 300.

The Nasan file system layers 302 and 304 in system 300 incorporate the functionality of the client local file system layer 154 and the server local file system 155. On the client 142, the Nasan file system 302 provides access to volume stored on the SAN-attached storage devices 126. On the NAS server 106, the Nasan file system 304 provides both read and write access to the volume. Like the local file system of the NAS server 155, the Nasan file system 304 on the NAS server 106 is able to create files, remove files, read files, write files, retrieve file attributions, modify file attributes, and lock files ranges.

Application programs 150 on the client 142 make file requests to the Nasan file system software layer 302. Nasan software 302 services most read requests and redirects write requests and other requests to the client-side remote file system layer 156.

The client-side remote file system layer 156 facilitates write access to files managed by the NAS server 106. The Nasan layer 302 passes write requests to the client-side remote file system 156. In turn, the client-side remote file system 156 transmits these requests via NAS protocols to the server-side remote file system layer 158 of the server 106. The server-side remote file system 158 passes the request to the Nasan layer 304, which completes the request by writing data to the SAN-attached devices 126.

SAN Write Optimization

The SAN write optimization enables Nasan clients 142 to write real-data across the SAN 128 without corrupting the volume stored on the SAN-attached devices 126. Writing data across the SAN requires a consistency scheme to coordinate simultaneous accesses by multiple computers to metadata and real-data. Although such a consistency scheme adds appreciable overheads to the file transfer times, SAN writes reduce overall transfer times when transferring large amounts of data. Large file transfers allow the high efficiencies of the SAN protocols to overcome the overheads imposed by the consistency scheme. In contrast, small file transfers through the NAS server 106 benefit from the low-latency consistency management of the NAS architecture despite the inefficiencies of NAS protocols.

Figure 11:
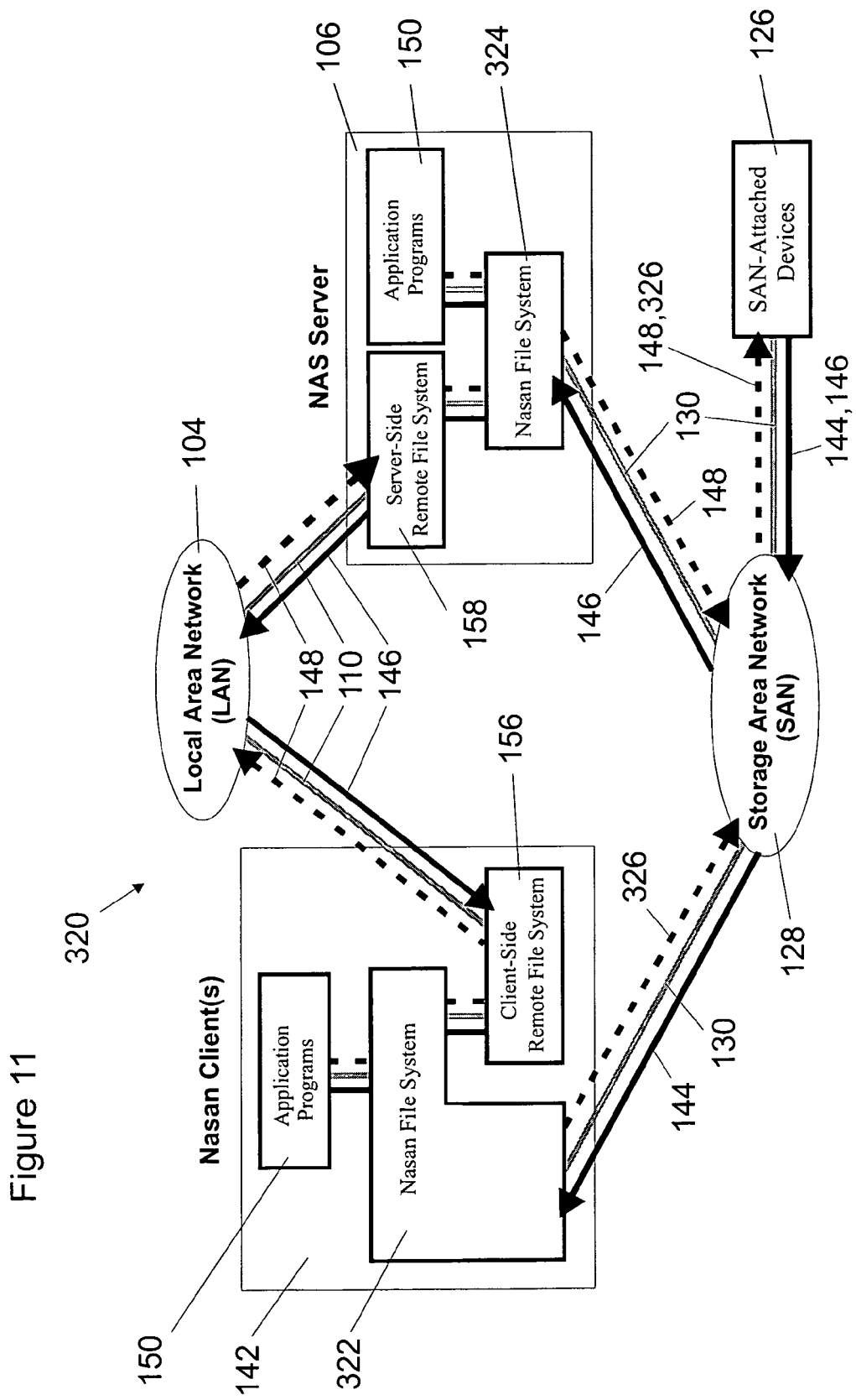
FIG. 11 is a representational drawing of the network environment of FIG. 10 showing the data-path that enables the present invention to directly write data to the SAN-attached devices.

FIG. 11 illustrates a system 320 in which the file system of the present invention is merged with local file system software and the SAN write optimization is enabled. On the Nasan client 142, write requests from the application programs 150 are passed to the Nasan file system layer 322. The Nasan layer 322 either forwards the write request to the client-side remote file system 156 or services the request using the SAN write data-path 326. Numerous factors are considered when determining which write data-path is used, including file sizes, request sizes, explicit user directions, and privileges of the clients 142.

Before real-data may be written across the SAN 128, the file must be fully allocated for the given range of the write request. Either the server 106 or the clients 142 must allocate this file range. The determination of which computer performs the allocation is typically based upon static policies setup by system administrations for each individual client 142.

Much like prior art SAN-based file systems with file server computers, the server-side Nasan file system 324 allocates blocks to the file range, without writing real-data, after receiving instruction by the remote file system 156,158. Clients 142 may also allocate the file range; however, special mechanisms must be in place that allow the clients 142 to access and modify block allocation tables of the volumes. In the preferred embodiment, the Nasan file system 322,324 gives access to the allocation tables through a file interface. Each volume has one or more special files that contain allocation tables. These files may be locked, read, and written by only the Nasan file system software 322,324.

On the server 106, the Nasan file system 324 allocates blocks by locking the allocation table files, modifying their contents, and then releasing the locks. The client-side Nasan file system 322 performs these same tasks by locking the allocation table files using the lock provisions of the remote file system 156,158. For performance reasons, the client-side Nasan software 322 reads and writes the allocation table files across the SAN data-paths 144,326.

Figure 12:
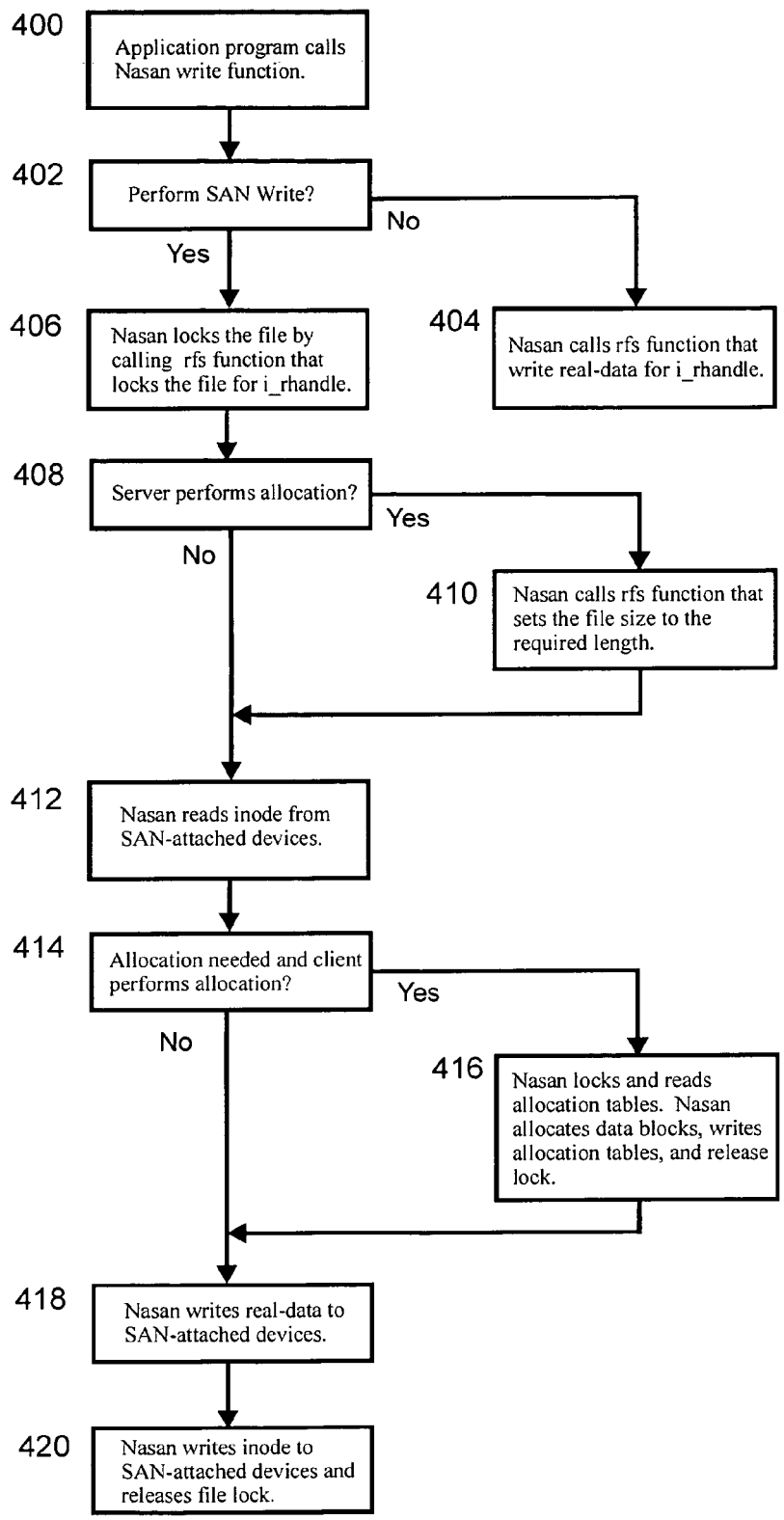
FIG. 12 is a flowchart showing the basic procedure of the present invention for writing data to a file using a data-path directly connecting the client to the SAN-attached devices.

The client-side file write operation of the present invention is illustrated in the flowchart of FIG. 12. The process starts by an application program 150 running on a Nasan client 142 desiring to write data to a file. The application 150 submits the write request to the operating system, which in turn invokes a call to the Nasan write function, as shown in step 400.

At step 402, the Nasan write function determines whether the request will utilize the SAN data-path 326 or the NAS data-path 148. If the NAS data-path 148 is to be used, control passes to step 404 where the Nasan write function forwards the request to the write function of client-side remote file system layer 156. The Nasan write completes after the remote file system 156 function completes.

If the Nasan write function determines that the SAN data-path 326 is to be used, at step 406, the Nasan client 142 acquires a lock on the file inode by submitting a file lock request to the client-side remote file system 156. This lock request is passed, through the LAN 104, to the server-side remote file system layer 158 of the NAS server 106. The remote file system 158 forwards the lock request to the Nasan file system layer 324. Before the server-side Nasan software 324 grants the lock, it flushes the caches of all metadata and real-data associated with the file.

Upon receiving acknowledgement from the NAS server 106 that the lock has been acquired, at step 408, the Nasan write function determines whether the client 142 or the server 106 is to perform allocation. If the client 142 is to perform allocation, the Nasan write function proceeds to step 412.

If the server 106 is to perform the allocation, at step 410, the client 142 initiates the allocation by invoking a set attribute call to the client-side remote file system layer 156. The client-size remote file system 156 then forwards this request to the server-side remote file system 158, which passes the request to the server-side Nasan file system software 326. In the preferred embodiment, the remote file system software 156, 158 is able to specify an allocation range within file; in other embodiments, the remote file system software 156,158 must specify the allocation for the entire file. Upon receiving an allocation request by the remote file system 158, the Nasan file system 324 allocates blocks to the specified file range and then flushes the on-disk inode to the SAN-attached devices 126.

At step 412, the client-side Nasan software 322 reads the on-disk inode structure for the file. Using this inode information, the Nasan software 322 determines if block allocation is necessary to perform the write request. If no allocation is necessary or if the allocation was performed at step 410, the write function continues to step 418.

If allocation is needed, the Nasan software 322 proceeds with block allocation at step 416 by acquiring the file lock of the allocation tables. Once the allocation tables are locked, the Nasan client 142 reads the allocation tables from the SAN devices 126, modifies the allocation tables, writes the tables to the SAN devices 126, and then releases the file lock.

At step 418, the file is fully allocated for the request range. The Nasan write function writes the real-data to the SAN-attached devices 126 via the SAN write data-path 326. Once this real-data write completes, at step 420, the modified on-disk inode is written by the client 142 to the SAN-attached devices 126 and the file lock is released by issuing an unlock request to the client-side remote file system 156. The remote file system 156 passes the unlock request to the server 106 which forwards the unlock request to the server-side Nasan file system 324. After the file lock is released, the Nasan write operation completes.

The invention is not to be taken as limited to all of the details thereof as modifications and variations thereof may be made without departing from the spirit or scope of the invention. For instance, the present invention was described and shown with the SAN and LAN networks appearing as separate, physical networks. However, as is well known in the prior art, it is possible to send SAN protocols and LAN protocols over the same physical network. The two networks are distinguishable by the protocols that are used to communicate between nodes on the network. In addition, although it is not shown in the drawings, it would be possible to use a client computer in the present invention as a file server that serves file requests from other computers. These other computers would likely have no access to the storage area network, but would have the ability to send file requests to the client computer of the present invention over a local area network. Because many such modifications and variations are present, the scope of the present invention is not to be limited to the above description, but rather is to be limited only by the following claims.

What is claimed is:

1. A system handling read and write file requests from an application, the read and write requests relating to real-data, the system comprising:
   a) a client computer;
   b) a server computer;
   c) a local area network;
   d) a SAN-attached storage device for storing the real-data, the SAN-attached storage device being connected to the client computer and the server computer via a storage area network;
   e) client programming on the client computer that receives read and write file requests from the application, wherein the client programming
      i) categorizes each file request into either a SAN file request or a LAN file request in part by comparing a file attribute received from the SAN-attached storage device via the storage area network with a second file attribute received from the server via the local area network,
      ii) submits LAN write file requests and the related real-data to the server via the local area network, and
      iii) handles SAN read requests and receives real-data relating to SAN read requests directly from the SAN-attached storage device; and
   f) server programming on the server computer, wherein the server programming
      i) receives the LAN write requests and the related real-data from the client computer, and
      ii) submits real-data related to the LAN write requests to the SAN-attached storage device for storage.

2. The system of claim 1, wherein all write requests are categorized as LAN write requests.

3. The system of claim 1, wherein the categorization of write requests into LAN write requests and SAN write requests occurs according to a factor chosen from the set of: file size, file request data size, explicit application directions, and privileges of the client computer.

4. The system of claim 1, wherein the client programming analyzes metadata related to the file requests.

5. The system of claim 4, wherein the client programming receives metadata directly from the SAN-attached storage device.

6. The system of claim 4, wherein the metadata is used by the client programming to assist in the categorization of file requests into SAN file requests and LAN file requests.

7. The system of claim 1, wherein the client programming further:
   iv) submits LAN read file requests to the server, wherein the client programming receives real-data relating to the LAN read requests from the server computer via the local area network.

8. The system of claim 1, wherein the client programming further:
   iv) handles SAN write requests to a file by:
      (1) requesting the server computer lock the file;
      (2) allocating data blocks to the file;
      (3) submitting real-data related to the SAN write request to the SAN-attached storage device for storage; and
      (4) requesting the server computer to unlock the file.

9. The system of claim 8, wherein the allocating of data blocks to the file is handled by the server computer after receiving a request from the client programming.

10. The system of claim 8, wherein the client programming accomplishes the step of allocating of data blocks to the file by requesting the server computer to lock the allocation table, reading the allocation table directly from the SAN-attached storage device, revising the allocation table, writing the revised allocation table directly to the SAN-attached storage device, and requesting the server computer to unlock the allocation table.

11. A system of networked computing devices comprising:
   a) a storage area network;
   b) a client computer running an application;
   c) a server computer;
   d) a SAN-attached storage device connected to the server computer and the client computer via the storage area network;
   e) logic that determines whether file requests are SAN file requests to be serviced directly via the storage area network or are server file requests to be serviced through the server computer;
   f) client programming on the client computer that receives file requests from the application, wherein the client programming
      i) services SAN file requests directly across the storage area network by
         (1) retrieving metadata relating to the file request directly from the SAN-attached storage device,
         (2) interpreting the metadata retrieved from the SAN-attached storage device, and
         (3) initiating real-data transfer between the client computer and SAN-attached storage device;
      ii) submits server file requests to the server; and
   g) server programming on the server computer, wherein the server programming services server file requests received from the client computer.

12. The system of claim 11, wherein the server programming services server file requests by retrieving real-data relating to read requests from the SAN-attached storage device via the storage area network and returns the real-data to the client computer.

13. The system of claim 11, wherein the server programming services server file requests by submitting real-data relating to write requests to the SAN-attached storage device via the storage area network.

14. The system of claim 11, wherein the server programming services server file requests by:
   i) retrieving real-data relating to read requests from the SAN-attached storage device via the storage area network and returns the real-data to the client computer, and
   ii) submitting real-data relating to write requests to the SAN-attached storage device via the storage area network.

15. The system of claim 11, wherein all write requests are server file requests.

16. The system of claim 11, wherein requests smaller than a certain size are determined to be server file requests.

17. The system of claim 11, wherein requests of files smaller than a certain size are determined to be server file requests.

18. The system of claim 11, wherein the logic is computed by the client programming.

19. The system of claim 11, wherein the logic is an upper level component.

20. A method for handling file requests for an application comprising:
   a) determining whether each file request is a local file request to be handled via a local file system, or whether the file request is a remote file request to be handled by a remote file system using a server computer in part by comparing a modification time received from the local file system with a second modification time received from the remote file system;
   b) submitting local file requests to the local file system, with real-data relating to the local file requests not passing through the server computer; and
   c) submitting remote file requests to the remote file system, with real-data relating to the remote file requests passing through the server computer.

21. The method of claim 20, wherein the step of determining whether the file request is a local file request or a remote file requests further comprises determining whether the file requests modify data stored on a storage device.

22. The method of claim 21 further comprising treating file requests that modify the storage device as remote requests and treating at least some of the file requests that do not modify the storage device as local requests.

23. The method of claim 20, wherein the modification time is a file modification time.

24. A method for handling file requests for an application executing on a client computer comprising:
   a) retrieving at the client computer metadata relating to the file requests via a local data-path;
   b) analyzing the metadata at the client computer;
   c) determining whether each file request is a local file request to be handled via the local data-path, or whether the file request is a remote file request to be handled by a remote data-path passing through a server computer;
   d) submitting local file requests to local programming executing on the client computer, with real-data relating to the local file requests not passing through the server computer; and
   e) submitting remote file requests to remote programming, with real-data relating to the remote file requests passing through the server computer.

25. The method of 24, wherein the local data-path is the path from the client computer to a SAN-attached storage device via a storage area network.

26. The method of 24, wherein the remote data-path is the path from the client computer to a SAN-attached storage device via a local area network, the server computer, and a storage area network.

27. A client computer handling read and write file requests from an application, the read and write requests relating to real-data, the client computer comprising:
   a) a local area network connection connecting the client computer to a local area network and to a server computer via the local area network;
   b) a storage area network connection connecting the client computer to a storage area network and to a SAN-attached storage via the storage area network, with the server computer also being connected to the storage area network;
   c) client programming on the client computer that receives read and write file requests from the application, wherein the client programming
      i) categorizes each file request into either a SAN file request or a LAN file request in part by comparing a file attribute received from the SAN-attached storage device via the storage area network with a second file attribute received from the server via the local area network,
      ii) submits LAN write file requests and the related real-data to the server via the local area network so that the server computer submits the real-data related to the LAN write requests to the SAN-attached storage device for storage, and
      iii) handles SAN read requests and receives real-data relating to SAN read requests directly from the SAN-attached storage device without sending any real-data over the local area network.

28. A client computer running an application comprising:
   a) a local area network connection connecting the client computer to a local area network and to a server computer via the local area network;
   b) a storage area network connection connecting the client computer to a storage area network and to a SAN-attached storage device via the storage area network, with the server computer also being connected to the storage area network;
   c) client programming on the client computer that receives file requests from the application, wherein the client programming
      i) receives file requests from the application wherein some file requests are SAN file requests to be serviced directly via the storage area network and other file requests are server file requests to be serviced through the server computer
      ii) services SAN file requests directly across the storage area network by
         (1) retrieving metadata relating to the file request directly from the SAN-attached storage device,
         (2) interpreting the metadata retrieved from the SAN-attached storage device, and
         (3) initiating real-data transfer between the client computer and SAN-attached storage device; and
      ii) submits server file requests to the server for processing by the server wherein real data is directly handled by the server in its communication between the client computer and the SAN-attached storage device.

29. A client computer running an application comprising:
a) a local area network connection connecting the client computer to a local area network and to a server computer via the local area network;
b) a storage area network connection connecting the client computer to a storage area network and to a SAN-attached storage device via the storage area network, with the server computer also being connected to the storage area network;
c) client programming on the client computer that receives file requests from the application, wherein the client programming
  i) receives file requests from the application wherein some read file requests are SAN file requests to be serviced directly via the storage area network and other read file requests and all write file requests are server file requests to be serviced through the server computer
  ii) services SAN file requests directly across the storage area network by initiating real-data transfer between the client computer and SAN-attached storage device without real data passing through the server; and
  iii) submits server file requests to the server for processing by the server wherein real data is directly handled by the server in its communication between the client computer and the SAN-attached storage device.

* * * * *

UNITED STATES PATENT AND TRADEMARK OFFICE
CERTIFICATE OF CORRECTION

| | | |
|---|---|---|
| PATENT NO. | : 7,552,197 B2 | Page 1 of 1 |
| APPLICATION NO. | : 11/637315 | |
| DATED | : June 12, 2009 | |
| INVENTOR(S) | : Soltis | |

It is certified that error appears in the above-identified patent and that said Letters Patent is hereby corrected as shown below:

On title page
Page 2, Column 2 (Other Publications)
Line 32, Delete "Workshop" and insert --Workshop on Workstation--.

Column 2
Line 52, After "allocation" insert --.--.

Column 22
Line 64, In Claim 28, delete "ii)" and insert --iii)--, therefor.

Signed and Sealed this
Twenty-eighth Day of December, 2010

David J. Kappos
*Director of the United States Patent and Trademark Office*